Patented June 20, 1933

1,914,892

UNITED STATES PATENT OFFICE

VARTKES MIGRDICHIAN, OF ELIZABETH, NEW JERSEY, ASSIGNOR TO AMERICAN CYANAMID COMPANY, OF NEW YORK, N. Y., A CORPORATION OF MAINE

ISOBARIC VACUUM FUMIGATION

No Drawing.  Application filed October 4, 1930. Serial No. 486,514.

My present invention relates to fumigation and more particularly to methods wherein the fumigant is absorbed to more or less degree by the material being fumigated.

In the fumigation of foods or the like, particularly with hydrocyanic acid as the fumigant, it is usual to accomplish contact in an evacuated chamber or space, the fumigant being drawn thereinto by the diminished pressure. It has been definitely determined that in such processes many substances absorb comparatively large quantities of fumigant and that this absorbed fumigant is ineffective for fumigation. It has also been found that the rate of the absorption, particularly of hydrocyanic acid, is proportional to the concentration of the fumigant in the space and that when the fumigant is introduced all at once or without the careful manipulation necessary to produce a constant pressure, absorption is so rapid that a large part of the fumigant is ineffective for the purposes desired.

It has been discovered that if the fumigant is injected into the space in a quantity sufficient to provide a lethal concentration, and if the pressure corresponding to this lethal concentration is maintained substantially constant by substantially continuously introducing fumigant into the space, the total quantity of fumigant will be more effectively utilized. By practicing such a procedure, a more efficient kill is produced from a given quantity of the fumigant.

In practicing the invention, it is desirable to provide a chamber which may be evacuated to any desired degree and into which the material to be fumigated is placed. This chamber is then evacuated by any desired apparatus, the chamber being provided with suitable gauges or manometers so that the pressure of the atmosphere or fumigant therein may be readily and accurately determined and adjusted.

I prefer to connect with the chamber containing the material to be evacuated, a fumigant supply of any desired design so arranged that fumigant may be let into the chamber in desired quantities as needed. With the above set-up it only becomes necessary to determine the chamber pressure which corresponds with a lethal concentration of fumigant, taking into consideration the time element, and to maintain this pressure substantially constant by continuously letting into the chamber sufficient quantities of the fumigant to maintain that pressure.

As a specific example, a material to be fumigated, such as foods or the like, may be placed in the chamber and the same evacuated to the desired degree. Upon closing off the vacuum connection and maintaining the chamber as tight as possible for a period of time, say a half hour, a point of equilibrium will be reached within the chamber which will then indicate the correct pressure of the material and its atmosphere. With this as a zero point, it may then be determined by simple calculation that, for instance, an additional 5 millimeters of fumigant pressure will indicate a lethal concentration for that particular space volume and the particular insect or life to be killed. Such being the case, the fumigant, for instance, hydrocyanic acid, is then let into the chamber until a rise in pressure of 5 millimeters of mercury is indicated. Absorption of the fumigant by the material being treated begins more or less immediately, with the result that the pressure will decrease below that indicated when the initial dosage of fumigant was let into the chamber. By proper manipulation of the valves between the fumigant supply and the evacuated space, fumigant may be continuously let thereinto so that the initial pressure of the material being treated and its atmosphere, plus the desired rise, which in this case may be 5 millimeters, will remain substantially constant throughout the fumigation period.

As it has been found that the rate of absorption increases with the concentration of the fumigant, it will be necessary to add fumigant where higher concentrations are desired in greater quantities than would be the case where a lesser concentration is desirable, but this constitutes merely judicious manipulation of the necessary valves between the fumigant supply and the evacuated space.

While hydrocyanic acid has been mentioned as a suitable fumigant, yet obviously the process herein described is equally applicable to any fumigant which is absorbed by the material undergoing treatment.

It has been proposed to introduce fumigant at intervals to the space to be fumigated in order to maintain a lethal concentration within the fumigated space, but these prior methods do not take into consideration absorption of the fumigant by the material being treated, neither do they contemplate the maintenance of a constant pressure within a space to be fumigated by constantly introducing into the space additional fumigant, particularly where a negative pressure is used, that is, less than normal, or a vacuum. As a result, much fumigant is lost through absorption, making such processes uneconomical. These deficiencies are obviated by practicing the herein described process.

While the invention has been described with particular reference to a specific method, yet obviously I do not wish to be limited thereto as the invention is to be construed broadly and restricted only by the scope of the claims.

I claim:

1. A method of fumigating which comprises introducing a fumigant into an evacuated space and maintaining the pressure therein below atmospheric and substantially constant.

2. A method of fumigating which comprises introducing a fumigant into an evacuated space substantially continuously and maintaining a constant pressure in said space less than atmospheric.

3. A method of fumigating which comprises introducing a fumigant into an evacuated space over an interval of time and in such quantities that the pressure therein will remain substantially constant and a lethal concentration of fumigant will exist in such space for a desired length of time while maintaining the pressure in said space below atmospheric.

4. A method of fumigating which comprises introducing a fumigant into an evacuated space containing material to be fumigated, in quantities which will compensate for fumigant absorbed by said material and maintaining the pressure in said space below atmospheric.

5. A method of fumigating which comprises introducing a fumigant into an evacuated space containing material to be fumigated, in quantities which will compensate for fumigant absorbed by said material as it is absorbed and maintaining the pressure in said space below atmospheric.

6. A method of fumigating which comprises introducing a fumigant into an evacuated space containing material to be fumigated, in quantities which will compensate for fumigant absorbed by said material and maintaining the pressure in said space substantially constant and below atmospheric.

7. A method of fumigating which comprises placing material to be fumigated within a chamber, evacuating said chamber, maintaining the pressure in said chamber below atmospheric, introducing fumigant into said chamber until a predetermined rise in pressure has taken place, and continuously adding fumigant to said chamber to maintain the resulting pressure substantially constant.

8. A method of fumigating which comprises placing material to be fumigated within a chamber, evacuating said chamber, maintaining the pressure in said chamber below atmospheric, introducing hydrocyanic acid into said chamber until a predetermined rise in pressure has taken place, and adding hydrocyanic acid to said chamber in quantities to maintain the pressure in said chamber constant.

In testimony whereof, I have hereunto subscribed my name this first day of October 1930.

VARTKES MIGRDICHIAN.